United States Patent [19]
Lundquist et al.

[11] Patent Number: 5,243,167
[45] Date of Patent: Sep. 7, 1993

[54] APPARATUS AND METHOD FOR MANUFACTURING A SLOTTED TORQUE TUBE

[75] Inventors: Ingemar H. Lundquist, 17 Mile Dr. at the Dunes, Pebble Beach, Calif. 93953-1186; Kurt O. Will, Hayward, Calif.

[73] Assignee: Ingemar H. Lundquist, Pebble Beach, Calif.

[21] Appl. No.: 945,538

[22] Filed: Sep. 16, 1992

[51] Int. Cl.$^5$ .......................... B23H 7/06; B23H 9/00
[52] U.S. Cl. .................................................. 219/69.12
[58] Field of Search ............... 219/69.11, 69.12, 69.16, 219/69.17, 69.2; 315/4

[56] References Cited

U.S. PATENT DOCUMENTS

| | | | |
|---|---|---|---|
| 4,371,432 | 2/1983 | Kyuchukov | 219/69.12 |
| 4,778,973 | 10/1988 | Derighetti et al. | 219/69.12 |
| 4,960,971 | 10/1990 | Kawanabe | 219/69.12 |
| 5,144,193 | 9/1992 | Warren | 315/4 |

FOREIGN PATENT DOCUMENTS

| | | | |
|---|---|---|---|
| 63-7228 | 1/1988 | Japan | 219/69.12 |
| 3-178730 | 8/1991 | Japan | 219/69.17 |

OTHER PUBLICATIONS

Fanuc Wire Cut EDM Model W2 Pamphlet, No Publication Date.
Elox High Speed Wire-Cut EDM Pamphlet, No Publication Date.

*Primary Examiner*—Geoffrey S. Evans
*Attorney, Agent, or Firm*—Flehr, Hohbach, Test, Albritton & Herbert

[57] ABSTRACT

Apparatus for manufacturing a plurality of slotted metal tubes simultaneously from a plurality of tubular members by the use of an EDM machine having a movable table which is movable in at least one direction of x and y directions, a moving wire traveling in a z direction with respect to the movable table and a computer for controlling the movement of the wire in the z direction and the movement of the movable table. The apparatus is comprised of first and second fixtures for receiving and holding a plurality of tubular members so that they are disposed in a plane in the z axis adjacent the moving wire. The first fixture is adapted to be mounted upon the table for movement with the table. A platform is provided for mounting the second fixture for movement in x and y directions. Electrical contact is made to the tubular members. The second fixture has a vise for gripping each of the tubular members, a secondary y drive is provided for moving the second fixture carried by the platform in a y direction independent of movement of the table in a y direction.

14 Claims, 6 Drawing Sheets

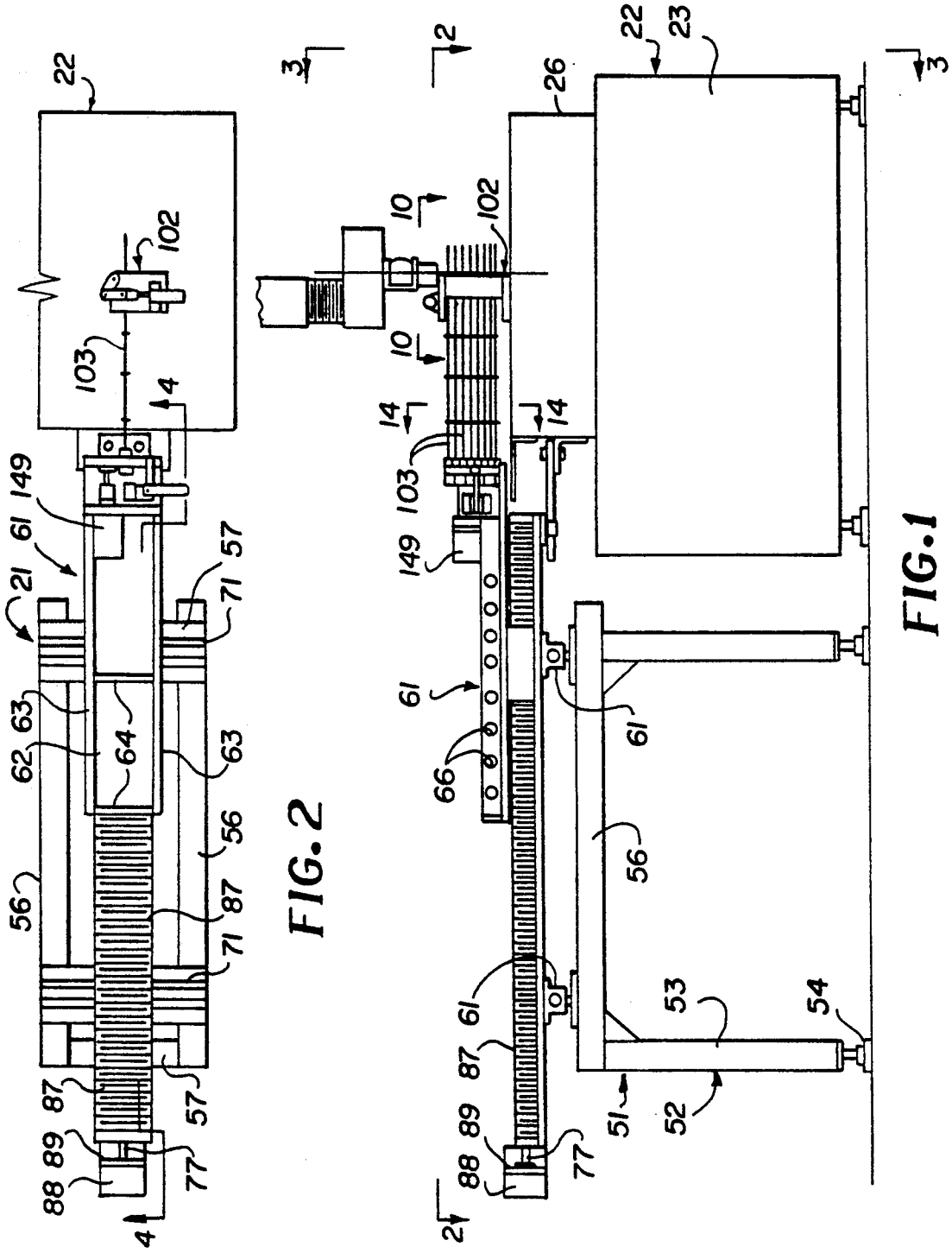

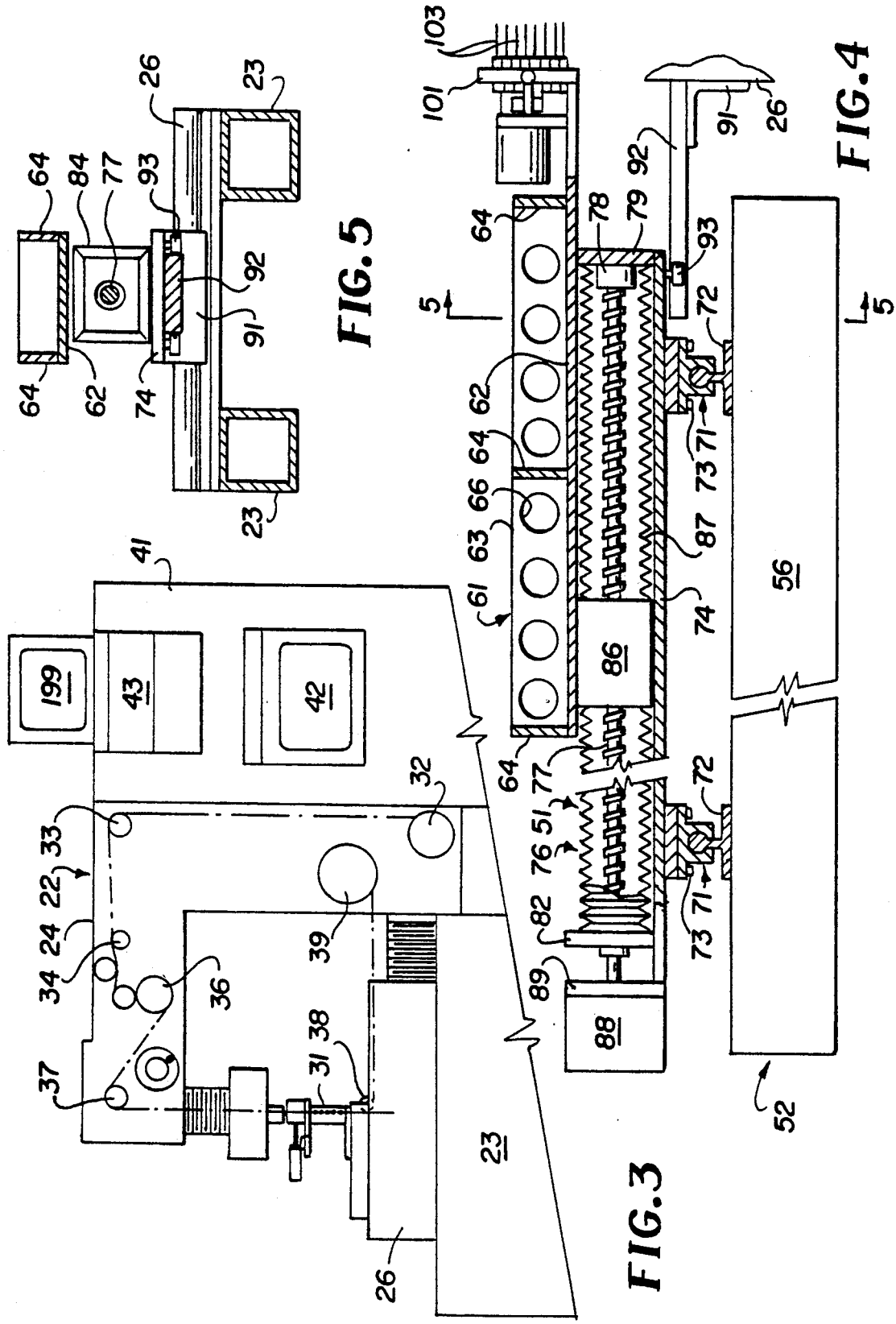

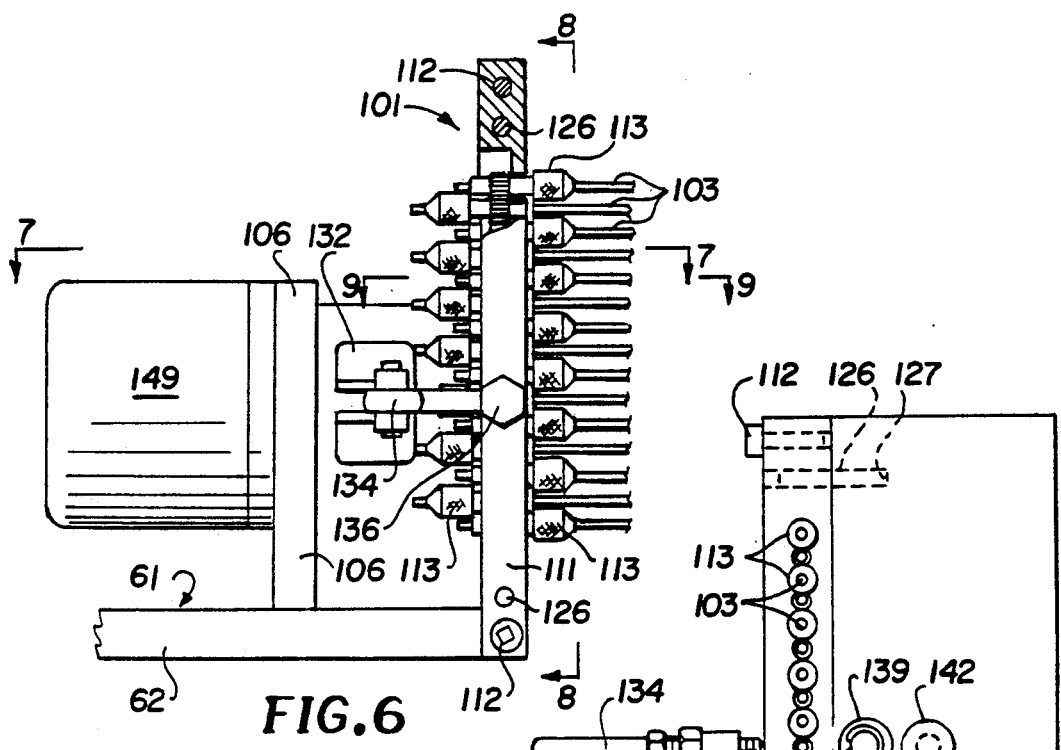
FIG.6
FIG.8
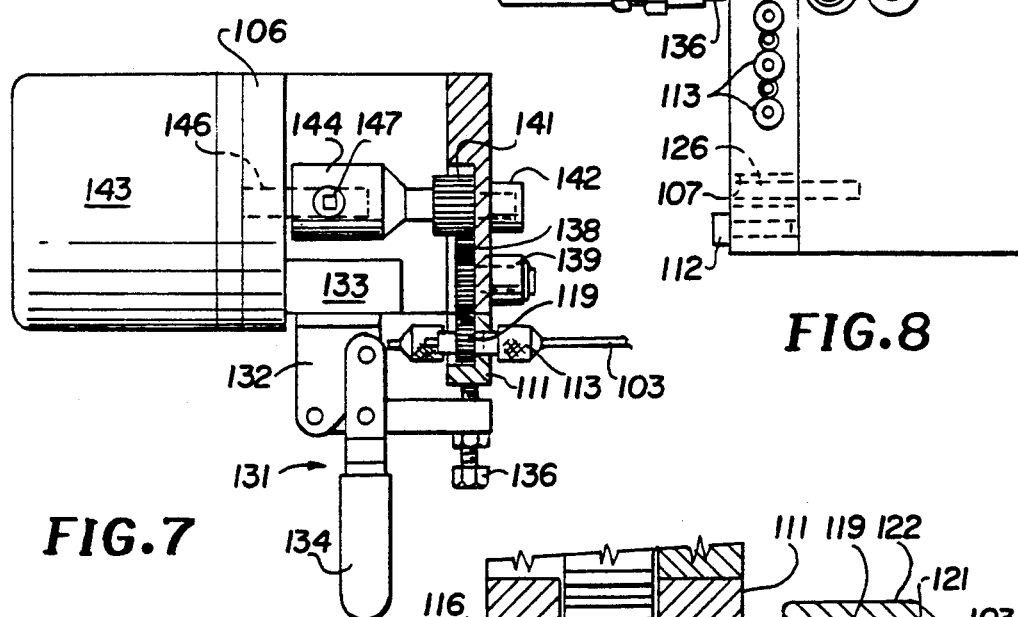
FIG.7
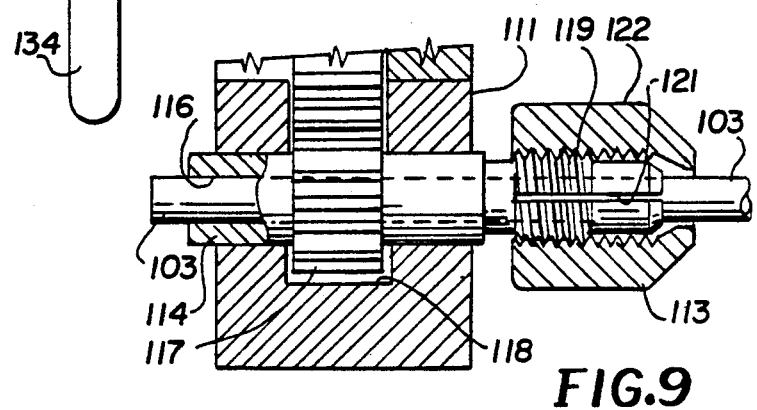
FIG.9

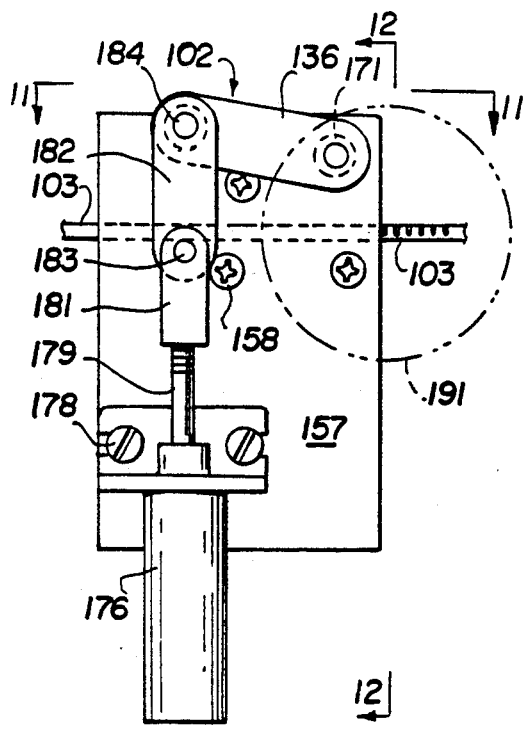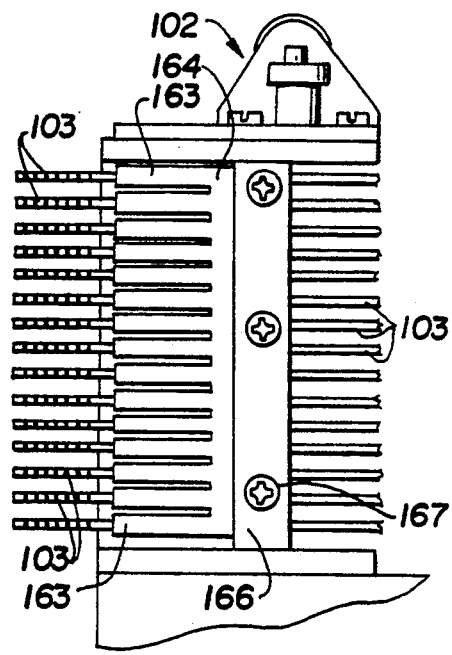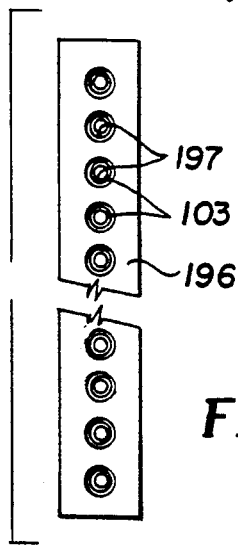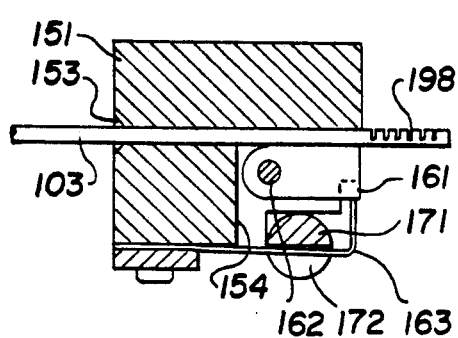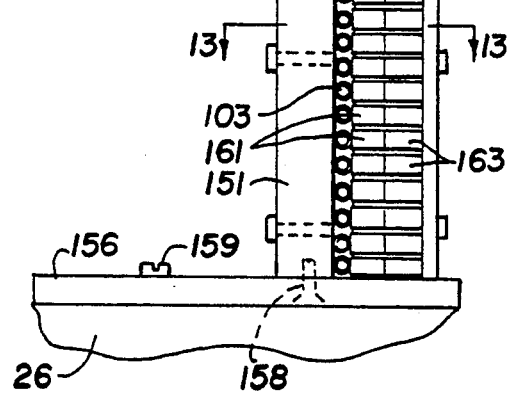
FIG.10
FIG.11
FIG.14
FIG.13
FIG.12

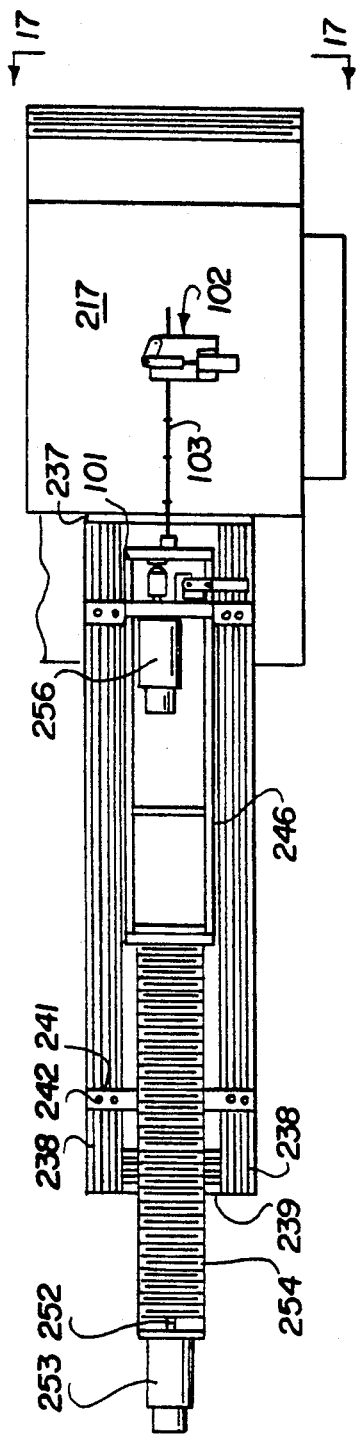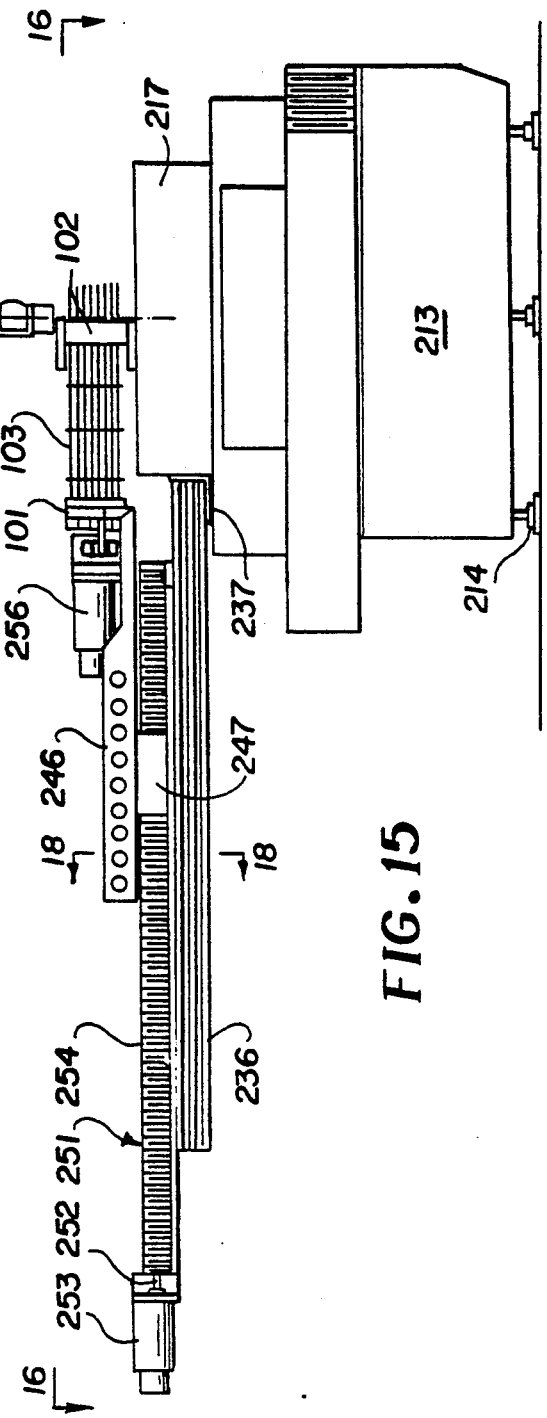
FIG.16
FIG.15

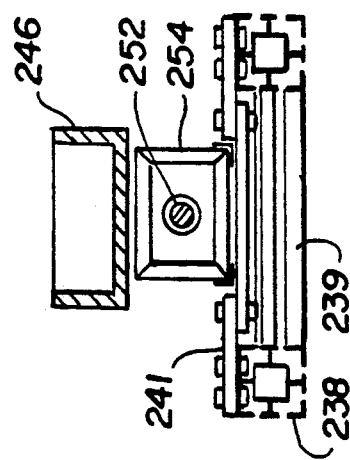
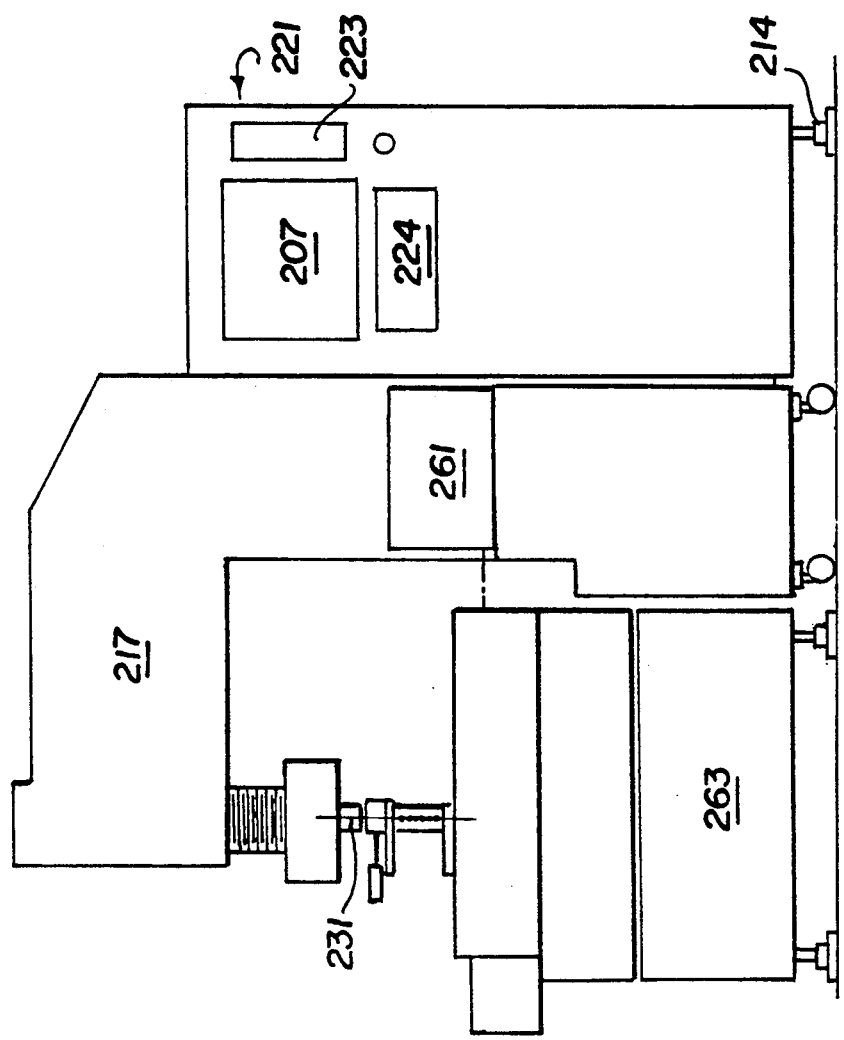
FIG. 18
FIG. 17

APPARATUS AND METHOD FOR MANUFACTURING A SLOTTED TORQUE TUBE

This invention relates to an apparatus and method for manufacturing a slotted torque tube and more particularly for manufacturing a plurality of slotted torque tubes simultaneously.

A need has arisen for slotted torque tubes of the types disclosed in co-pending application Ser. No. 07/725,660 filed on Jul. 3, 1991. Typically, such torque tubes are formed of a metal such as stainless steel and are provided with a plurality of longitudinally spaced apart slots which subtend angles of less than 360°. In certain torque tubes the slots may be offset radially with respect to each other. In order to be able to manufacture such torque tubes in volume and economically, there is a need for an apparatus and method for manufacturing such slotted torque tubes. Heretofore, such an apparatus and method have not been available.

In general, it is an object of the present invention to provide an apparatus and method for manufacturing slotted torque tubes.

Another object of the invention is to provide an apparatus and method of the above character in which a plurality of the slotted torque tubes can be manufactured simultaneously.

Another object of the invention is to provide an apparatus and method of the above character in which electrical discharge machining is utilized.

Another object of the invention is to provide an apparatus and method of the above character which is substantially automatic.

Another object of the invention is to provide an apparatus and method of the above character which manufactures high quality slotted torque tube economically.

Another object of the invention is to provide an apparatus and method of the above character for manufacturing slotted torque tubes of small diameter.

Additional objects and features of the invention will appear from the following description in which a preferred embodiment is set forth in conjunction with the accompanying drawings.

FIG. 1 is a front elevational view of an apparatus incorporating the present invention for manufacturing a plurality of slotted torque tubes simultaneously.

FIG. 2 is a cross-sectional view taken along the line 2—2 of FIG. 1.

FIG. 3 is a side elevational view taken along the line 3—3 of FIG. 1.

FIG. 4 is a cross-sectional view taken along the line 4—4 of FIG. 2.

FIG. 5 is a cross-sectional view taken along the line 5—5 of FIG. 4.

FIG. 6 is an enlarged detail view partially in cross-section showing one of the fixtures for mounting the torque tubes.

FIG. 7 is a cross-sectional view taken along the line 7—7 of FIG. 6.

FIG. 8 is a cross-sectional view taken along the line 8—8 of FIG. 6.

FIG. 9 is a cross-sectional view taken along the line 9—9 of FIG. 6.

FIG. 10 is a top plan view of another of the fixtures utilized in the apparatus of the present invention.

FIG. 11 is a view looking along the line 11—11 of FIG. 10.

FIG. 12 is a view looking along the line 12—12 of FIG. 10.

FIG. 13 is a cross-sectional view taken along the line 13—13 of FIG. 12.

FIG. 14 is a cross-sectional view taken along the line 14—14 of FIG. 1.

FIG. 15 is a side elevational view of an apparatus incorporating another embodiment of the present invention for manufacturing a plurality of slotted torque tubes simultaneously.

FIG. 16 is a top plan view of the apparatus shown in FIG. 15 taken along the line 16—16 of FIG. 15.

FIG. 17 is an end elevational view of the apparatus shown in FIG. 16 looking along the line 17—17 of FIG. 16.

FIG. 18 is a cross-sectional view taken along the line 18—18 of FIG. 15.

In general, the apparatus for manufacturing a plurality of slotted metal torque tubes simultaneously from a plurality of tubular members is accomplished by the use of an EDM machine having a movable table movable in at least one direction of x and y directions. The machine is provided with a moving wire travelling in the z direction with respect to the movable table. Computer-operated means is provided for controlling the movement of the wire in the z direction and the movement of the movable table. The apparatus is comprised of first and second fixtures for receiving and holding a plurality of tubular members so that they are disposed in a plane in the z axis adjacent the moving wire. Means is provided for mounting the first fixture on the table for movement with the table. Means is provided for mounting the second fixture for movement in x and y directions. The first fixture has means for making electrical contact to the tubular members. The second fixture has vice means for gripping each of the tubular members. Secondary drive means is provided for moving the second fixture in a y direction independent of movement of the table in a y direction. Means is carried by the second fixture for causing rotational movement of the tubular members. Drive means is provided which is coupled to the computer operated means for moving the tubular members in axial directions through the first fixture whereby a plurality of slots disposed in the z direction are formed simultaneously in the plurality of tubular members and thereafter additional longitudinally spaced apart slots are formed in the tubular members to form torque tubes.

More in particular, as shown in the drawings, the apparatus 21 of the present invention consists of a suitable high speed wire cut EDM machine 22 such as manufactured by the Elox Division of Colt Industries. As is well known to those skilled in the art, such a machine 22 consists of a base 23 which has an L-shaped framework 24 mounted thereon, the outer extremity of which overlies a movable table normally disposed in a horizontal plane and which is movable in at least one direction of x and y directions. The wire 31 which is utilized by the machine 22 travels in a vertical or a z direction with respect to the table 26 in the region immediately above the table 26 and is utilized for electrical discharge machining (EDM) for manufacturing slotted torque tubes as hereinafter described. The EDM wire 31 can be of the conventional type, as for example a copper-zinc composition supplied by Electrotools of Broadview, Ill. 60153.

As can be seen, the wire 31 is supplied from a supply reel 32 and travels upwardly over a roller 33, over and under a plurality of rollers 34, and over a supply control roller 36, and thence over a roller 37 and then downwardly as shown in FIG. 3 through the table 26, and then under a roller 38 to a take-up reel 39 or alternatively into a collection container (not shown). The EDM machine is also provided with a control console 41 which includes a dedicated computer with a built-in CRT 42 and control panels 43. The computer control is used for controlling various motors and other operations of the EDM machine, well known to those skilled in the art. In particular, it controls the speed of travel of the wire 31 and the movement of the table 26, as well as other functions associated with the apparatus of the present invention as hereinafter described.

The conventional EDM machine 22 hereinbefore described has a movable table 26 which has limited movement capabilities which are inadequate for manufacturing the relatively long torque tubes of the present invention. Therefore, in accordance with the present invention, additional or auxiliary table means has been provided to accommodate the very long torque tubes. It should be appreciated that, if desired, an EDM machine could be constructed especially adapted for this purpose which has a large table which would eliminate the need for the auxiliary table means of the present invention. However, in order to utilize a conventional EDM machine for such manufacturing, auxiliary table means 51 in the form of an auxiliary support table is provided and consists of a separate table 52. The separate table 52 consists of four spaced-apart legs 53 which are provided with adjustable feet 54. A pair of horizontally disposed, parallel spaced apart longitudinal members 56 are secured to the upper extremities of the legs 53. Spaced apart cross members 57 extending between the ends of the members 56. The table 52 is disposed in relatively close proximity to the base 22 of the EDM machine, as shown in FIG. 1, and has generally the same elevation as the base 23.

A platform 61 is provided which consists of a flat plate 62 lying generally in a horizontal plane and is provided with spaced apart stiffening members 63 extending longitudinally of the plate 62 and cross-stiffening members 64 extending transversely of the plate 62. Lightening holes 63 are provided in the stiffening members 63 and 64. The stiffening members 63 and 64 ensure that the plate 62 remains straight during its movement hereinafter described.

Means is provided for permitting movement along x and y directions of the platform 61 with respect to the table 52, and movement in a y direction independent of movement of the table 26 in a y direction and consists of parallel, spaced apart, linear slide bearings 71 which are mounted transversely of the longitudinal members 56 of the table 52. One part 72 of the linear slide bearing 71 is secured to the longitudinal member 56, whereas the other part 73 is secured to a plate 74 which forms a base of a lead screw mechanism 76. The lead screw mechanism 76 consists of an elongate lead screw 77 which has one end rotatably mounted in a bearing 78 mounted on a vertical plate secured to the base 74. The other end of the lead screw is mounted in a bearing 81 mounted in a vertical plate 82, also secured to the base plate 74. A lead screw nut 86 is threadedly mounted on the lead screw and is secured to the bottom of the platform 61 so that the platform 61 moves with the nut 86 as the lead screw is rotated. The lead screw nut 86 and the lead screw 76 are enclosed within an elongate bellows 87 to keep it clean and to prevent dirt from getting into the threads of the lead screw.

Means is provided for driving the lead screw and consists of a stepper motor 88 mounted upon a plate 89 and secured to the base 74. The stepper motor 88 is controlled by the computer provided in EDM machine 22. Thus it can be seen by operation of the motor 88, the platform 61 can be moved in a x direction or in a direction which is longitudinal of the wire 31 passing through the table 26. Means is also provided for imparting movement in a y direction to the platform 61, and consists of means for connecting the plate 77 to the table 26 so that it moves in the y direction of the table 26, and consists of a bracket 91 which is secured to the table 26 and which has an elongate plate 92 secured thereto and extending in a horizontal plane. The sides of the plate 92 are adapted to be engaged by a pair of rollers 93 depending downwardly from the forward extremity of the plate 74 of the lead screw assembly. Thus, it can be seen that as the table 26 moves in a y direction, the plate 92 will engage the rollers 93 to cause movement of the lead screw plate 74 in the y direction and to thereby, at the same time, cause the movement of the platform 61 in a y direction. Because the plate 92 is long in length, the plate 92 can accommodate the necessary movement of the lead screw assembly 76 in the x direction.

First and second fixtures 101 and 102 are provided as part of the apparatus of the present invention, and are utilized for supporting elongate metallic tubular members 103 which are to be manufactured into slotted torque tubes in accordance with the present invention. The tubular members can be of any suitable size and material. Typically they are formed of a stainless steel, and can have a suitable diameter, as for example 0.095" outside diameter and 0.077" inside diameter, to have a wall thickness of approximately 0.009". The first fixture 101 is mounted on the forward extremity of the platform 61. Its details are shown in FIGS. 6, 7 and 8. First and second spaced apart, vertically extending support plates 106 and 107 are provided on the forward extremity of the plate 72 for the purpose of mounting the first fixture 101 and its associated drive mechanism.

The first fixture 101 consists of a split bearing block 111 which is held together by cap screws 112 provided at opposite ends of the same. A plurality of pin vises 113 are mounted in the bearing block 111 for receiving one end of each of the tubular members 103 which are to be utilized for manufacturing torque tubes in accordance with the present invention. The pin vises 113 are arranged vertically, or in other words, so that they are disposed in a direction which is parallel to the direction of the wire 31 when it travels through the table 26.

Each of the pin vises 113, as shown in FIG. 11, consists of a tubular port 114 which has a bore 116 extending therethrough that is adapted to receive the elongate tubular members 103 to be manufactured into torque tubes. The tubular port 114 is rotatably mounted within the split bearing block 111 and is provided with a spur gear 117 mounted thereon, which is adapted to rotate in a recess 118 provided in the bearing block 111. The proximal extremity of the tubular port 114 of the pin vise extending beyond the bearing block 111 is provided with threads 119. A slot 121 extends through the outer extremity of the tubular portion and through the threads 111. A knurled ferrule 122 is threaded onto the threads 119 and is adapted to clamp the tubular member therein in a manner well known to those skilled in the art.

In order to reduce the spacing between the pin vises, every other pin vise is reversed with respect to the other pin vise, as shown particularly in FIGS. 6 and 8. In this way, it is still possible to maintain the tubular members retained therein in alignment, as for example in a vertical plane which is parallel to the plane of the travel or the z axis of the wire 31 through the table 26. The spur gear 117 provided on the pin vises 113 serially engage each other so that they will all rotate in the same direction, although alternate pin vises extend in an opposite direction in the bearing block. As hereinbefore pointed out, the split bearing block is fastened together by the cap screws 112 after the pin vises 113 have been mounted therein. After the tubular members 103 have been mounted in the pin vises, the bearing block 111 can be secured to the support plate 107 in a suitable manner such as by the use of a pair of pins 126 which are provided in the support plate 107 and extend outwardly therefrom and which are adapted to extend through holes 127 provided in the bearing block to ensure appropriate registration between the bearing block 111 and the support plate 107.

The bearing block 111 can then be held in place by a conventional off-center clamping mechanism 131. The clamping mechanism 131 is provided with a bracket 132 which is secured to a block 133 mounted upon the support plate 106. It also includes a lever arm 134 which carries a cap screw adjustably mounted thereon which is adapted to engage the bearing block 111, as particularly shown in FIG. 7, to firmly clamp the bearing block 111 to the support plate 107. When the bearing block 111 is clamped to the support plate 107, one of the gears 117 carried by the pin vises engages spur gear 138 which is rotatably mounted in support plate 107 by bearing 139. The spur gear 138 is engaged by a drive gear 141, also rotatably mounted upon the support plate 107 by the bearing 142. The gear 141 is supported by a spindle 144 secured to a shaft 146 by suitable means such as a set screw 147. The shaft 146 is an output shaft which is rotatably mounted in the support plate 101 and is driven by a stepper motor 149. The stepper motor 149 is again controlled by the computer of the EDM machine 22 for rotating the tubular members 103, as hereinafter described.

The second fixture 102 is shown more particularly in FIGS. 10, 11, 12 and 13, and consists of a block 151 formed of a suitable material such as stainless steel. The block is provided with a plurality of holes or bore 152 extending therethrough, which are aligned in a vertical or a z direction parallel to the travel of the wire 31 through the table 26. Each of the holes 152 is provided with a conical recess 153 leading into the hole 152, as shown particularly in FIG. 13. The block 151, as shown in FIG. 13, is substantially L-shaped in cross section and is provided with a rectangular cut-out in the same. The block 151 serves as an electrical contact block for making electrical contact to the tubular members 103. The block 151 is mounted between a pair of vertically spaced apart plates 156 and 157, and is secured thereto by flush-mounted screws 158. The bottom plate 156 is secured to the table 26 by cap screws 159.

Means is provided for ensuring that good electrical contact is made with the tubular members 103, and consists of an interposer contact 161 provided for each of the tubular members 103. The interposer contacts 161 are pivotally mounted within the recess 154 by pins 162 mounted in the block 151. The interposer contact 161 is typically made of material similar to that utilized for brushes in DC motors, as for example a carbon material embedded with a conducting material of a type well known to those skilled in the art. Means is provided for yieldably urging the distal extremity of the interposer contact remote from the pivot pin 162, and consists of a spring finger 163. As can be seen from FIG. 11, a spring finger 163 is provided for each of the interposer blocks 116, which in turn, one of which is provided for each of the tubular members 103. It should be appreciated that spring finger members 163 can be formed as separate members or, as shown in FIG. 11, can be formed from a single sheet 164 of a suitable material such as beryllium copper which is clamped to the block 151 by suitable means such as a plate 166 overlying the sheet 164 and clamped to the block 151 by recessed Phillips-head screws 167.

When it is desired to reduce the friction between the tubular members 103 and the interposer contacts 161, means is provided for bringing the spring fingers 163 out of engagement with the interposer contacts 161 and consists of a shaft 171 which is provided with recessed 172 into which the spring fingers 163 extend. It can be seen that when the shaft 171 is rotated in either a clockwise or a counterclockwise direction, the spring finger 163 will be moved out of engagement with the interposer contacts 161 to thereby permit forward movement of the tubular members for forming the next slot in the tubular members as hereinafter described. Means is provided for imparting reciprocal movement to the shaft 171 and consists of an air cylinder 176 mounted upon a bracket 177 secured to the plate 157 by a cap screw 178. The air cylinder 176 is provided with a plunger 179 which has a clevis 181 threadedly mounted thereon and pivotally connected to a link 182 by a pin 183. The link 182 is pivotally connected by a pin 184 to an arm 186. The arm 186 is fixed to one end of the shaft 171. Thus, it can be seen that by operation of the air cylinder 176 the plunger 179 can be reciprocated between two positions, one position being the one shown in FIG. 13 in which the spring contacts are permitted to yieldably urge the interposer contacts into engagement with the tubular members 103 and another position in which they are moved out of engagement with the interposer block 161.

As can be seen in FIG. 10, the block 151 is disposed in close proximity to the EDM head 191 of the EDM machine 22 to cause electrical discharge machining utilized for forming the slots in the tubular member to provide a slotted torque tube to be made in accordance with the present invention.

Operation and use of the apparatus 21 for performing the method to simultaneously form slots in a plurality of vertically disposed metal tubular members may now be briefly described as follows. Let is be assumed that it is desired to manufacture a plurality of torque tubes in accordance with the present invention. The bearing block 111 is removed from the support plate 107 by opening up the clamping mechanism 134 and lifting the bearing block off of the pins 127. The cap screws 112 are then unscrewed to separate the bearing block into its two parts. Each pin vise 113 is then removed, and one end of one of the tubular members 103 inserted into the pin vise 113. As pointed out hereinbefore, every other pin vise 113 is rotated by 180°. After all the pin vises 113 have been attached to the ends of the tubular members, the pin vises 113 are dropped into the bearing block so that the alternative pin vises 113 extend in opposite directions but with their gears 117 serially meshing with each other. The bearing block 111 is then reassembled with the pin vises 113 therein by securing the cap screws 112. The tubular members 113 can be of a suitable length, as for example 50 inches. The bearing block 111 is then mounted on the support plate 107 by mounting the same upon the pins 127 and fastening it in place by the clamping mechanism 131 into the position shown in FIG. 7. The free ends of the tubular members are then taken and spacers 196 of the type shown in FIG. 14 are placed at appropriate intervals along the lengths of the tubular members. For example, three of such spacers can be provided, with spaced apart holes 197 as shown in FIG. 1.

The free ends of the tubular members are then inserted through the holes 152 in the conducting and holding block 151 with the spring fingers 163 being held out of engagement with the interposer blocks 161 by rotation of the shaft 172 by 180° from the position shown in FIG. 13. As soon as all of the tubular members 103 have been inserted into the block 151, the air cylinder 176 can be operated to rotate the shaft 171 to the position shown in FIG. 13 so that the spring fingers 163 can yieldably urge the interposer contacts 161 into firm engagement with the tubular members to make good electrical contact therewith.

As soon as this has been accomplished, the remainder of the operation for forming the slots in the tubes is performed in accordance with a program inserted into the computer of the EDM machine and viewing an additional CRT monitor 199. The first step of the EDM machine is to cut all of the extremities of the tubular members 103 extending out of the cutting block 151 off to the same length. This can be accomplished by EDM machining. Thereafter, let it be assumed that it is desired to cut a slot which extends into the side walls of the tubular members but which subtends less than 360° in each of the vertically disposed tubular members 103 simultaneously. This is accomplished by having the computer control the table 26 so that it moves along the y axis in a direction transverse of the moving wire 31 in a controlled manner so that by electrical discharge machining, radially extending slots are formed in the tubular members 103. As soon as a cut has been made to the desired depth, the table 26 is moved in the opposite direction along the y axis so that the moving wire 31 clears the tubular members 103. Let is be assumed that it is desired to cut another slot in the tubular members, longitudinally spaced from the first-named slots. The air cylinder 176 is then operated to move the spring fingers 163 out of engagement with the interposer contacts 161. The computer thereafter causes the stepper motor 188 to be operated to rotate the lead screw 77 to advance the tubular members the desired distance through the holes 152 in the block 151. As soon as this has occurred, the air cylinder 176 is again operated to permit the spring fingers 163 to move the interposer contacts 161 into engagement with the tubular members 103. Thereafter, the table 26 is again moved to bring the tubular members toward the moving wire 131 to cause electrical discharge machining of slots in all of the vertically disposed tubular members simultaneously. As soon as the desired depth has been reached, the table 26 is again moved along the y axis so that the moving wire 31 clears the tubular members 103. The same operation as hereinbefore described can then be utilized for advancing the tubular members the next increment for forming the next slot in the tubular members. This procedure can be continued until the desired number of slots have been formed in the torque tube, which can extend, if desired, for the entire length of the torque tube. Thus, it can be seen that the fixtures 101 and 102 are utilized for moving the tubular members toward and away from the vertically moving cutting wire.

In accordance with the present invention, the apparatus also can be utilized for cutting slots 198 which are disposed in different circumferential positions of the tubular members. This can be accomplished by the computer controlling the stepper motor 149 to cause rotation of all of the tubular members 103 simultaneously the desired degree of rotational movement. As hereinbefore explained, each of the pin vises 113 is provided with a gear 117 which is driven in the same rotational direction by the drive gear driven by the stepper motor 149. Thus, it can be seen that under the control of the computer of the EDM machine, in addition to controlling the x and y movement of the tubular members 103, the rotational position of the tubular members can also be controlled to provide slots in different angular positions on the tubular members.

Another apparatus 211 incorporating another embodiment of the present invention is shown in FIGS. 15-18. As shown therein, such apparatus 211 consists of a suitable table EDM wire cutting machine 212 which is Fanuc wirecut EDM model W2 machine supplied by Fanuc Ltd. of Japan. The machine 212 is provided with a base 213 having feet 214 adjustable in height. A table 216 is mounted upon the base 213 for movement in x and y directions generally in a horizontal plane. An L-shaped upstanding framework 217 is mounted on the base 213 and overlies the table 216 (see FIG. 17). The machine 212 also includes a control console 221 which houses a dedicated computer (not shown) with a built-in color CRT 222 and control panels 223 and 224. The dedicated computer is utilized for controlling the various motors of the machine 212 and other operations of the machine. It for example controls the speed of travel of the wire 231 which travels along the z axis perpendicular to the table 217 as well as other functions associated with the machine as hereinafter described. The wire 231 is fed and taken up in a manner similar to that hereinbefore described in conjunction with the previous embodiment and thus will not be described.

A cantilevered table extension 236 serving as an auxiliary support table is mounted on the table 217 in a suitable manner such as by a right angle bracket 237 (see FIG. 15). The table extension 236 is comprised of a pair of spaced apart parallel elongate members 238 formed of a suitable material such as extruded aluminum, one end of each member 38 is secured to the right angle bracket 237 and the other end of each member 38 is fastened together by a spacer member 239 also formed of a suitable material such as extruded aluminum which the member 39 extends at right angles to the members 238. A support bar 241 is provided which extends across the top of the elongate members 238 and is secured thereto by screws 242.

A platform 246 overlies the table extension 236 and is supported on the table extension 236 by a pair of spaced apart plates 247. The platform 246 is substantially identical to the platform 61 described in the previous embodiment. Thus, it can be seen that the platform 246 will move with the cantilevered table extension 236 and that the table extension 236 will move in x and y directions at the same time that the table 217 is moved in x and y directions.

Means is provided for causing movement of the platform 246 in a y direction independent of movement of the table 217 in the y direction in the form of secondary y drive means 251 and consists of a lead screw means 252 of the type hereinbefore described which is driven by an electric drive motor 253. The drive motor 253 operates in a closed loop and can be of a suitable type such as an AC servo motor provided by GE Fanuc, Model 1-OS, three phase, eight poles, 2000 rpm. The motor operates on 2000 pulses per revolution. The lead screw drive 252 is enclosed is an elongate bellows 254 of the type hereinbefore described.

First and second fixtures 101 and 102 of the type hereinbefore described are mounted respectively on the platform 246 and on the table 217. In place of the motor 149 provided in the previous embodiment, a different motor 256 similar to the motor 253 is provided for the primary rotation utilized in conjunction with the fixture 101. A control cabinet 261 is provided as a part of the machine 212. The cabinet 261 includes necessary controls for operating the driving motors 253 and 256 so that they operate in conjunction with the drive motors (not shown) for operating the table 217 for moving it in x and y directions.

Operation and use of the apparatus 211 is similar to that described in conjunction with the operation and use of the apparatus 21 hereinbefore described. As hereinbefore described, the principal difference between the apparatus 211 and the apparatus 21 is that the apparatus 21 is provided with a table 52 which remains in a fixed position and does not move with the table 26. In the apparatus 211, the table extension 236 is secured to the table 26 and moves with the table 26. This makes it possible for the apparatus 211 to perform more complicated operations in making cuts in tubular members. For example, it permits cuts to be made in a tubular members 103 along the y axis which is not possible with the apparatus 21.

The type of cuts which can be provided in tubular members is described in co-pending application Ser. No. 07/918,922, filed Jul. 22, 1992 (A-54222-3). For example, in making one type of cut which is an L-shaped cut in the tubular members, the apparatus 211 can be programmed to first cut off one end the tubular members 103. This can be accomplished by moving the first fixture 101 in a y direction and then executing the cut-off by movement of the table in the x direction. Thereafter, the tubular members are advanced in the y direction and a slot is cut into the tubular members by movement of the table 217 in the x direction until the slots are cut to the desired depth. Thereafter the table 217 is moved in the y direction. As soon as the cuts have been made to the desired distance in the y direction, the cutting wire 231 is backed out of the slot by first reversing in the y direction and then reversing in the x direction to retrace to a zero position. Thereafter, the tubes 103 can be rotated in the manner hereinbefore described to the desired angle. The secondary y drive can then be moved to advance the tubes 103 in the y direction in a position for the next cut for the next slot. Thereafter, the slot can be formed by first moving in the x direction and then the y direction and then retracting the same through the same steps to the original starting position. These steps are repeated to cut additional L-shaped slots until the desired pattern has been cut into the tubular members 103.

Thus it can be seen that with the apparatus 211 it is possible to provide more complex cuts in the tubes than was possible with the apparatus 21 hereinbefore described. In other words, it is possible to make cuts in the y direction as well as in the x direction. From the foregoing it can be seen that there has been provided an apparatus and method for manufacturing a plurality of slotted orque tubes simultaneously. In this way, it is possible to produce such complicated torque tubes in quantity with various slot configurations economically and with high quality.

What is claimed is:

1. In an apparatus for manufacturing a plurality of slotted metal tubes simultaneously from a plurality of tubular members by the use of an EDM machine having a movable table which is movable in at least one direction of x and y directions, a moving wire traveling in a z direction with respect to the movable table and computer operated means for controlling the movement of the wire in the z direction and the movement of the movable table the apparatus comprising first and second fixtures for receiving and holding a plurality of tubular members so that they are disposed in a plane in the z axis adjacent the moving wire, the first fixture being adapted to be mounted upon the table for movement with the table and means for mounting the second fixture for movement in x and y directions, said first fixture having means for making electrical contact to the tubular members the second fixture having vise means for gripping each of the tubular members and secondary y drive means for moving the second fixture in a y direction independent of movement of the table in a y direction.

2. An apparatus as in claim 1, together with means for causing simultaneous rotational movement of the tubular members.

3. Apparatus as in claim 1 wherein said means for mounting the second fixture includes a support platform secured to said table and movable with said table.

4. Apparatus as in claim 1 wherein said means for mounting the second fixture includes a support platform and means for connecting the support platform to the table so that it moves with the table as the table moves in the y direction but permitting relative movement of the table in the x direction with respect to the support platform.

5. Apparatus as in claim 1, wherein said first fixture includes separate contact members for each of the tubular members.

6. Apparatus as in claim 5, together with yieldable means engaging the contact means for each of the tubular members.

7. An apparatus as in claim 6, together with means for moving the yieldable means out of engagement with the contact means to permit the tubular members to be advanced through the first fixture along the x direction upon movement of the second fixture of the x direction.

8. In an apparatus for manufacturing a plurality of slotted metal tubular members simultaneously from a plurality of tubular members with the use of a wire cutting EDM machine having a movable table movable in at least one direction of x and y directions in a plane and having an EDM wire moving in a z direction with respect to the table and a computer for controlling the movement of the wire and the movable table, the apparatus comprising an auxiliary support table, a support platform, means mounting said support platform on said auxiliary support table to permit movement along the y axis, means securing the support platform to the movable table so that the support platform is moved along the y axis as the movable table moves along the y axis linear drive means connected to the support platform for moving the support platform along the y axis, a first fixture mounted upon the movable table, a second fixture mounted on the support platform, said first fixture having holes therein adapted to receive said tubular members and having means for making electrical contact therewith, said second fixture having means for grasping each of the tubular members and motor drive means connected to the second fixture for causing simultaneous rotational movement of the tubular members mounted therein.

9. Apparatus as in claim 8, wherein said means for engaging said tubular members includes pin vises, a bearing block for supporting said pin vises, said pin vises having gears provided thereon and gearing means for driving all of the gears on the pin vises simultaneously to cause rotation of the tubular members in the same direction.

10. Apparatus as in claim 8 wherein said auxiliary support table is adapted to be disposed adjacent to the movable table so that it is mounted in a stationary position with respect to the movable table, said means for securing the support platform to the auxiliary support table permitting relative movement of the movable table along the x axis with respect to the support table.

11. Apparatus as in claim 8 together with means for securing the auxiliary support table to said movable table so that the auxiliary support table moves in x and y directions as the movable table is moved in x and y directions.

12. In a method for manufacturing a plurality of slotted metal torque tubes simultaneously from a plurality of tubular members by the use of an EDM machine having a movable table which is movable in at least one direction of x and y directions, a moving wire travelling in a z direction with respect to the movable table, and computer operated means for controlling the movement of the wire in the z direction and the movement of the movable table in the y direction, the method comprising the steps of placing a plurality of the tubular members in a plane lying in the z direction and in close proximity to the wire, moving the tubular members along a x axis toward the wire so that a plurality of slots are formed simultaneously in the tubes in the z direction, moving the slotted tubes in the x direction away from the wire, moving the tubular members along the y direction an incremental amount, advancing the tubular members in one direction toward the wire to cause a plurality of slots to be formed simultaneously in the torque tubes, moving the torque tubes away from the wire in an x direction and thereafter repeating the steps to provide a plurality of spaced apart slots extending longitudinally of each of the tubular members to provide slotted torque tubes.

13. A method as in claim 12, together with the step of rotating the tubular members simultaneously so that certain of the slots formed in the torque tubes subtend different angles from the angles subtended by other slots in the tubular members.

14. A method as in claim 12, together with the step of advancing the tubular members in a y direction after the tubular members have been advanced in an x direction to form L-shaped slots therein, thereafter moving the tubular members in an opposite y direction and thereafter in an opposite x direction to return to a starting position and thereafter completing the same sequence of steps to provide a plurality of spaced apart L-shaped slots extending longitudinally of the tubular members.

* * * * *